United States Patent
Farone et al.

(10) Patent No.: US 9,551,522 B2
(45) Date of Patent: Jan. 24, 2017

(54) SELF-COOLING COMPOSITIONS, SYSTEMS AND METHODS

(71) Applicant: Heat Wave Technologies, LLC, Marina del Rey, CA (US)

(72) Inventors: William Farone, Irvine, CA (US); Tracy Palmer, Temecula, CA (US)

(73) Assignee: Heat Wave Technologies, LLC, Marina del Rey, CA (US)

( * ) Notice: Subject to any disclaimer, the term of this patent is extended or adjusted under 35 U.S.C. 154(b) by 222 days.

(21) Appl. No.: 14/480,245

(22) Filed: Sep. 8, 2014

(65) Prior Publication Data

US 2015/0184916 A1 Jul. 2, 2015

Related U.S. Application Data

(63) Continuation of application No. 13/271,133, filed on Oct. 11, 2011, now Pat. No. 8,826,672.

(51) Int. Cl.
| | |
|---|---|
| *F25D 5/00* | (2006.01) |
| *F25D 5/02* | (2006.01) |
| *C09K 5/16* | (2006.01) |
| *C09K 5/18* | (2006.01) |

(52) U.S. Cl.
CPC . *F25D 5/02* (2013.01); *C09K 5/16* (2013.01); *C09K 5/18* (2013.01); *F25D 5/00* (2013.01); *F25D 2331/805* (2013.01)

(58) Field of Classification Search
CPC .............. F25D 5/02; F25D 3/107; F25B 8/004
USPC ........................ 62/4, 86, 294, 457.9; 126/263
See application file for complete search history.

(56) References Cited

U.S. PATENT DOCUMENTS

| | | | | |
|---|---|---|---|---|
| 3,596,801 | A | * | 8/1971 | Barnack ............. B65D 81/3272 |
| | | | | 206/222 |
| 3,957,472 | A | | 5/1976 | Donnelly |
| 3,970,068 | A | | 7/1976 | Sato |
| 4,067,440 | A | * | 1/1978 | Lataix ................... A61J 1/2089 |
| | | | | 206/222 |

(Continued)

FOREIGN PATENT DOCUMENTS

| | | |
|---|---|---|
| JP | 02-269180 A | 2/1990 |
| WO | WO 2010/066772 A1 | 6/2010 |
| WO | WO 2013/055662 A1 | 4/2013 |

OTHER PUBLICATIONS

International Search Report and Written Opinion, Applicaiton No. PCT/US2012/59310, dated Jan. 23, 2013, 9 pages.

(Continued)

*Primary Examiner* — Melvin Jones
(74) *Attorney, Agent, or Firm* — Knobbe, Martens, Olson & Bear, LLP

(57) ABSTRACT

Self-cooling compositions and systems adapted to rapidly chill a substance in a compact container are provided. In some implementations, the composition comprises an aqueous solution and solid chemical reactants, wherein at least one solid chemical reactant is selected independently from the group consisting of $NH_4NO_3$, urea, and mixtures thereof; and a second solid chemical reactant is selected independently from the group consisting of $NH_4Cl$, calcium sulfate, borax, phosphates, $MgCl_2$, carrageenan, and mixtures thereof. The self-cooling compositions and systems can have a wide range of applications such as cooling comestibles or medical assay kits.

5 Claims, 5 Drawing Sheets

(56) References Cited

U.S. PATENT DOCUMENTS

| | | | |
|---|---|---|---|
| 4,528,218 | A | 7/1985 | Maione |
| 4,751,119 | A | 6/1988 | Yukawa |
| 4,753,085 | A | 6/1988 | Labrousse |
| 8,826,672 | B2 | 9/2014 | Farone et al. |
| 2001/0008072 | A1 | 7/2001 | Kohout |
| 2008/0016882 | A1 | 1/2008 | Neuweiler |
| 2009/0078711 | A1 | 3/2009 | Farone et al. |

OTHER PUBLICATIONS

International Preliminary Report on Patentability and Written Opinion, Application No. PCT/US2012/059310, dated Apr. 24, 2014, 7 pages.

* cited by examiner

SELF-COOLING COMPOSITIONS, SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present inventions generally relate to self-cooling compositions, systems and methods such as self-cooling containers for rapidly chilling a substance contained therein.

Description of the Related Art

There is increasing demand in both the consumer market and the medical arena for a convenient and effective container which may be used by individuals to cool either consumable products, such as coffee, tea, milk, soup, and many other types of beverage or food products, at any time and any location, or to cool testing assays, such as drug identification tests, viruses and many other similar applications without having access to any conventional cooling means, such as a refrigerator, a freezer or ice. The self-cooling technology is generally based on endothermic reactions between different reagents. Under such self-cooling technology, two or more reagents are initially separated by a breakable partition, and when there is a need for cooling to occur, the partition is broken to allow the mixing of the reagents, thereby creating an endothermic reaction for heat absorption to occur. Typically, the reagents employed for cooling include at least a solid material, such as ammonium nitrate, and a liquid material, such as water.

The currently available self-cooling systems, however, have several shortcomings. First, the rate of heat absorption is often inadequate to cool the desired amount of beverage in a short period of time. Second, the amount of solid chemicals required to produce an adequate amount of heat absorption may be too large to be incorporated into a conveniently sized container for either consumers or for fieldwork. Third, an adequate amount of cooling may not be produced for a sufficient length of time to allow heat to be continuously drawn from the substance and to keep the substance at the desired temperature for a selected time period.

SUMMARY OF THE INVENTION

In one aspect, embodiments of the present inventions provide a self-cooling composition comprising an aqueous solution and a solid chemical reactant mixture. Upon contacting the aqueous solution with the solid chemical reactant mixture, the aqueous solution dissolves the solid chemical reactant mixture, preferably producing within two minutes a heat absorption solution resulting from one or more endothermic reactions that can reduce the temperature of a substance from about 20-25° C. to less than 10° C., more preferably to less than 3° C., more preferably at about 0° C. In certain implementations, the self-cooling composition maintains the temperature of the substance at about at least 10° C. for at least one minute. In one implementation, at least one solid chemical reactant of the cooling composition is selected independently from the group consisting of ammonium nitrate ($NH_4NO_3$), urea, and mixtures thereof; and a second solid chemical reactant is selected independently from the group consisting of ammonium chloride ($NH_4Cl$), calcium sulfate, borax, phosphates, magnesium chloride ($MgCl_2$), and carrageenan.

In another aspect, embodiments of the present inventions provide a method of cooling a substance in a chamber. The method includes contacting an aqueous solution with a solid chemical reactant mixture to form a heat absorption solution resulting from one or more endothermic reactions. The cooling solution is in fluid contact with the chamber. The solid chemical reactant mixture includes a first chemical reactant, a second chemical reactant, and optionally a third chemical reactant. The first chemical reactant is allowed to sufficiently endothermically react with the aqueous solution to form a heat absorption solution that is within a lower temperature range. The second chemical reactant is then allowed to sufficiently endothermically react with the aqueous solution to maintain the lower temperature range. The optional third chemical reactant is then allowed to sufficiently endothermically react with the aqueous solution to maintain the temperature range of the heat absorption solution, thereby cooling the substance.

In yet another aspect, embodiments of the present inventions provide a method of cooling a substance in a chamber. The method includes contacting an aqueous solution with a solid chemical reactant mixture. The aqueous solution is allowed to dissolve the solid chemical reactant mixture thereby producing within two minutes a cooling solution having a temperature between about 3° C. to 0° C. The cooling solution is in fluid contact with the chamber. Finally, the cooling solution is allowed to absorb heat from the chamber or to cool the chamber while maintaining a temperature of about 3° C. to about 0° C. for at least one minute within the cooling solution thereby cooling the substance inside the chamber. In some embodiments, the temperatures of the cooling solution in the dissolving step and the heat absorption step are each from about 3° C. to about 0° C.

In yet another aspect, embodiments of the present inventions provide a self-cooling apparatus, such as a self-cooling container, designed to rapidly chill a substance contained therein, preferably from about 20-25° C. to less than 10° C., more preferably to about 3° C. to about 0° C. In some embodiments, the self-cooling apparatus comprises a cooling chamber containing a substance to be cooled, a reactant chamber adjacent to the cooling chamber having a first enclosed compartment containing an aqueous solution, a second enclosed compartment containing a solid chemical reactant mixture, and a breakable partition between the first enclosed compartment and the second enclosed compartment. In one implementation, the solid chemical reactant mixture comprises about 0 to 25 weight percent carrageenan, about 0 to 25 weight percent urea, and about 25 to 95 weight percent ammonium nitrate ($NH_4NO_3$). In another implementation, the solid chemical reactant mixture consists essentially of about 0 to 25 weight percent carrageenan, about 0 to 25 weight percent urea, and about 25 to 95 weight percent ammonium nitrate ($NH_4NO_3$). The self-cooling apparatus can be used in a variety of different applications, such as cooling a comestible substance, a medical field test kit, or a personal care product.

DETAILED DESCRIPTION OF THE PREFERRED EMBODIMENT

Figure 1:
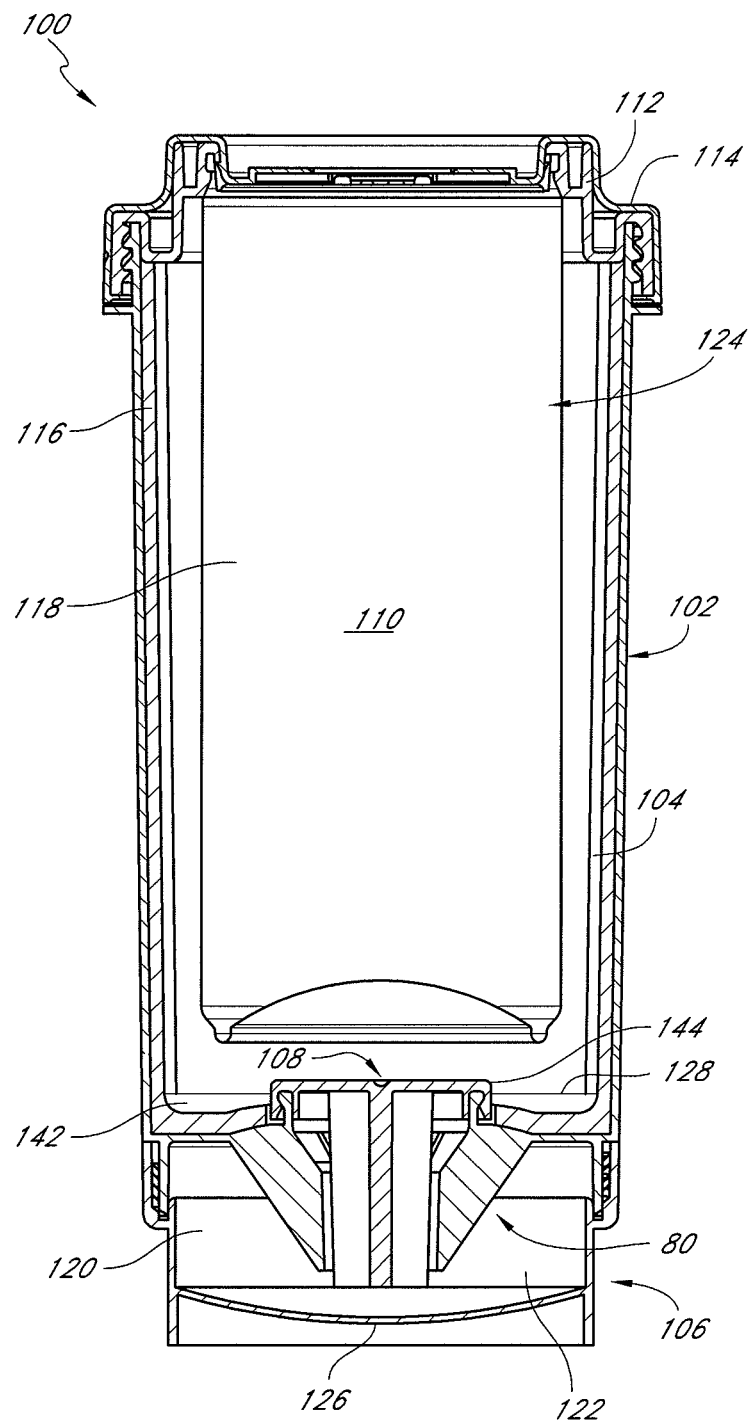
FIG. 1 shows a self-cooling apparatus in accordance with one preferred embodiment of the present invention.

In certain preferred embodiments, the self-cooling system disclosed herein is preferably in the form of a compact self-cooling apparatus configured to hold a substance and rapidly cool the substance by an endothermic reaction of chemicals that are held within the apparatus and separated from the substances to be cooled. The chilled substance can be a comestible substance, or a substance that is part of a medical assay kit, or any other material that requires cooling. In preferred implementations, the self-cooling system is configured so that the amount and rate of heat transferred from the substance are controlled in accordance with the volume of substance to be cooled to ensure rapid cooling of the substance. The preferred embodiments of the self-cooling system incorporate engineered improvements in various aspects of the system, including improved chemical compositions, apparatus construction and design, optimized heat transfer properties, and controlled heat transfer systems. Each of these attributes will be discussed below.

The following terms may be used throughout the application, and for clarity some common definitions are provided, but all are broad terms and shall have their ordinary meanings, and shall include, but not be limited to the definition provided.

As used herein, the term "soup," is a broad term and shall have its ordinary meaning, and shall include, but not be limited to, a mixture of food material in liquid form or a mixture of food particles in liquid.

As used herein, the term, "reactant mixture," is a broad term and shall have its ordinary meaning, and shall include, but not be limited to, a single chemical or a combination of chemicals, which react with another component such as a liquid, e.g., water.

As used herein, the term, "self-cooling," is a broad term and shall have its ordinary meaning, and shall include, but not be limited to, a material/apparatus, which causes the contents to become cold; that is, which upon measurement has lowered temperatures.

As used herein, the terms, "heat absorbing solution" or "heat absorbing mixture," are broad terms and shall have their ordinary meaning, and shall include, but not be limited to, a solution or mixture, which absorbs or removes heat from the surrounding environment.

As used herein, the terms, "cooling," "chilling," and "heat absorbing," are used interchangeability.

I. Self-Cooling Chemical Compositions

Heat transfer for the self-cooling apparatus disclosed herein can be achieved by endothermic reactions involving two or more reactants. Embodiments of the present inventions provide a self-cooling composition comprising an aqueous solution and solid chemical reactants, wherein at least one solid chemical reactant is independently selected from the group consisting of ammonium nitrate ($NH_4NO_3$), urea, and mixtures thereof; and a second solid chemical reactant is selected independently from the group consisting of ammonium chloride ($NH_4Cl$), calcium sulfate, borax, phosphates, magnesium chloride ($MgCl_2$), carrageenan, and mixtures thereof.

In another aspect, embodiments of the self-cooling composition provide a solid chemical reactant mixture which has a mass of less than 75 grams (g.) and an aqueous solution which has a volume of less than 100 milliliter (ml.), and the solid chemical reactant and aqueous solution can be used to cool about 192 ml. of a substance that is primarily water.

In a further aspect, embodiments of the self-cooling composition provide a solid chemical reactant mixture with a mass of less than 75 g. and an aqueous solution with a volume of less than 100 ml. which together can be used to cool a cup containing about 6.5 ounces of a substance, such as beverage or soup.

In one embodiment, the solid chemical reactant mixture of the self-cooling composition comprises about 0 to 25 weight percent carrageenan, about 0 to 25 weight percent urea, and about 25 to 95 weight percent ammonium nitrate ($NH_4NO_3$). In another embodiment, the solid chemical reactant mixture of the self-cooling composition consists essentially of about 0 to 25 weight percent carrageenan, about 0 to 25% weight percent urea, and about 25 to 95 weight percent $NH_4NO_3$.

In yet another embodiment, the solid chemical reactant mixture used in the cooling method comprises about 0 to 25 weight percent carrageenan, about 0 to 25 weight percent urea, and about 25 to 95 weight percent $NH_4NO_3$.

In a further aspect, the solid chemical reactant mixture can have a mass of less than 75 g. and the aqueous solution can have a volume of less than 100 ml.

In one aspect, a lower temperature can be achieved by providing a high differential temperature from the apparatus contents to the coolant. The heat absorbing material can have a high heat capacity; e.g., is able to absorb the heat transferred without warming up rapidly so as to maintain the temperature differential as heat is transferred.

In a further aspect, embodiments of the present invention provide a self-cooling composition to use in an apparatus comprising an aqueous solution and a solid chemical reactant mixture. In some embodiments, the solid chemical reactant mixture includes urea. The proportions of urea may be from 0 to 25 percent.

In some embodiments, the total combined mass of carrageenan, urea, and $NH_4NO_3$ in the self-cooling composition is less than 100 g. In other embodiments, the solid chemical reactant mixture consists of urea and chloride salts. In other embodiments, the solid chemical reactant mixture consists of $NH_4NO_3$, urea, carrageenan, $NH_4Cl$, calcium sulfate, borax, $MgCl_2$, phosphates and mixtures thereof. The magnesium chloride may be anhydrous magnesium chloride, dihydrate magnesium chloride, or a mixture thereof. As another example, calcium chloride may be anhydrous calcium chloride, monohydrate calcium chloride, dihydrate calcium chloride, or a mixture thereof. Where the calcium sulfate, magnesium chloride or calcium chloride is specified as a particular hydration state (e.g. anhydrous, monohydrate, or dihydrate), one of skill will understand that trace amounts of other hydration states may be present as impurities.

In some embodiments, the solid chemical reactant mixture may have a mass of less than 100 g. The aqueous solution may have a volume of less than 100 ml.

In another aspect, embodiments of the present invention provides a solid chemical reactant mixture comprising reactants selected independently from a first group consisting of urea and $NH_4NO_3$, and a second group consisting of carrageenan, calcium sulfate, sodium phosphate, $MgCl_2$, ammonium chloride, and borax. The term "mixture," when used in the context of a solid chemical reactant mixture herein, means a substance composed of one or more components, each of which retain its own properties.

As the term suggests, the solid chemical reactant mixtures are preferably in solid form, meaning that the chemical reactants within the mixture do not include liquid reactants. In some embodiments, the urea, $NH_4NO_3$, carrageenan or other selected reactants are thoroughly mixed together when added to a self-cooling apparatus. In other embodiments, the reactants are present as layers in the self-cooling apparatus. Thus, in some embodiments, the selected compounds, such as urea, $NH_4NO_3$, carrageenan, are not actually mixed together when forming the solid chemical reactant mixture.

It has been discovered that the solid chemical reactant mixture of certain preferred embodiments provide surprising and advantageous properties for use within self-cooling apparatuses, for example as described herein, and in the pending US patent applications, U.S. Patent Application 20090078711, filed Mar. 26, 2009, and U.S. Patent Application 20090199843 filed Aug. 13, 2009 which are hereby incorporated by reference in their entity. It is typically desirable to achieve a high instantaneous heat absorbing reaction in the self-cooling apparatus and a high heat transfer rate through the apparatus into the substance to be chilled. Thus, upon dissolving this mixture in an aqueous solution, significant heat absorption occurs quickly and is maintained effectively over the desired period. For example, where the self-cooling apparatus is a container comprising a chamber containing a substance to be cooled, the mixture produces, upon dissolving in an aqueous solution, sufficient heat absorbing energy to a desired amount of the substance and to maintain the lower temperatures for a desired amount of time.

In some embodiments, the solid chemical reactant mixture consists essentially of urea and $NH_4NO_3$. In other embodiments, the solid chemical reactant mixture consists essentially of urea, $NH_4NO_3$, and carrageenan. In other embodiments, the solid chemical reactant mixture consists essentially of $NH_4NO_3$ and carrageenan. In certain implementations, the proportions of urea and $NH_4NO_3$ can be from 35 to 65 parts, from 40 to 60 parts, and from 50 to 50 parts, respectively. The proportions of urea, $NH_4NO_3$, and carrageenan can be from 0 to 50 parts, 0 to 50 parts, 1 to 3 parts, respectively. In some implementations, the total combined mass of urea and $NH_4NO_3$ is less than 100 g.

In other embodiments, the mixture forms part of an aqueous solution. The proportions of urea, $NH_4NO_3$ and carrageenan may be adjusted according to the teachings herein to cool the aqueous solution sufficiently to cool the substance to about or less than 10° C. in about 120 seconds.

II. Self-Cooling Apparatus

A self-cooling apparatus designed in accordance with certain preferred embodiments will now be described more fully hereinafter with reference to the accompanying drawings. The apparatus may, however, be embodied in many different forms and should not be construed as limited to the embodiments set forth herein. As described in greater detail below, the self-cooling apparatus can be used in conjunction with the self-cooling compositions of the preferred embodiments to rapidly chill a substance contained therein.

The self-cooling apparatus preferably comprises (a) a cooling chamber containing a substance to be cooled; (b) a reactant chamber adjacent to the cooling chamber having a first enclosed compartment containing a first reactant, and a second enclosed compartment containing a second reactant, wherein the first reactant and the second reactant are independently a solid chemical reactant mixture or an aqueous solution. For example, if the first reactant is a solid chemical reactant mixture, then the second reactant is an aqueous solution, and vice versa; and (c) a breakable partition between said first enclosed compartment and said second enclosed compartment.

In some embodiments, an appropriate self-cooling apparatus comprises a cooling chamber for containing a substance to be cooled. The apparatus can also include a reactant chamber adjacent to the cooling chamber. The reactant chamber preferably comprises a first enclosed compartment and a second enclosed compartment. The first enclosed compartment can contain a first reactant and the second enclosed container can contain a second reactant. The first reactant can be a solid chemical reactant mixture and the second reactant can be an aqueous solution, or vice versa. The container further comprises a breakable partition between the first enclosed compartment and the second enclosed compartment. Upon breaking the breakable partition, the aqueous solution contacts the solid chemical reactant mixture.

The substance to be cooled may be any appropriate substance, but are typically liquids and/or solids. In a preferred embodiment, the substance is a comestible substance (e.g. liquid and/or solid), such as a beverage (e.g. coffee, tea, or water), a soup, or a solid food, etc. In other preferred embodiments, the substance can be part of a medical field test assay kit, or other substance that requires cooling at places where electrical power source is not available.

In some embodiments, the self-cooling apparatus disclosed herein is preferably a compact self-cooling apparatus configured to hold a substance, such as about 6-12 fluid ounces of a beverage, and rapidly cool the substance by reaction of chemicals that are held within the container and separated from the substances to be cooled. The apparatus can be implemented such that a prepackaged container (e.g., a prepackaged can) serves as an inner container body. Various components configured to facilitate such a self-cooling apparatus are described in reference to FIGS. 1-4.

FIG. 1 shows a sectional view of a self-cooling apparatus 100 configured to receive and retain a container such as a can 110, such that the wall of the container defines, for example, the inner container body 116 and the interior of the container defines a cooling chamber 118. In certain embodiments, various components of the apparatus 100 of FIG. 1 can be in modular forms so as to provide advantageous features such as flexibility in design and ease of assembly.

As shown, the apparatus 100 includes a housing 102 having a side wall and first and second ends. In certain embodiments, the first end is the top end and the second end the bottom end when the apparatus is held upright (relative to the orientation of the can held in the apparatus). A first cap 112 can be configured to couple to the first end of the housing 102, and a second cap 106 can be configured to couple to the second end of the housing 102. In the description herein, the first and/or second caps 112, 106 may also be referred to as closures or closure. Further, in the particular example shown in FIGS. 1, 2A and 2B, the second cap 106 may also be referred to as a cup. In the particular example configuration where a reactant held by the cup is water, the second cap 106 may function as and be referred to as a water cup.

As described herein, the first cap 112 can be configured to retain a prepackaged container such as a can 110. In certain embodiments, a drinking lid 114 can optionally be configured and provided to fit over the first cap 112. An insulating sleeve 104 such as a foam sleeve insertable in the housing 102 can also be provided as an option. In certain embodiments, the insulating sleeve 104 can have its outer dimension (e.g., diameter) and length selected to slidably fit substantially within the inner wall of the housing 102.

Figure 4A:
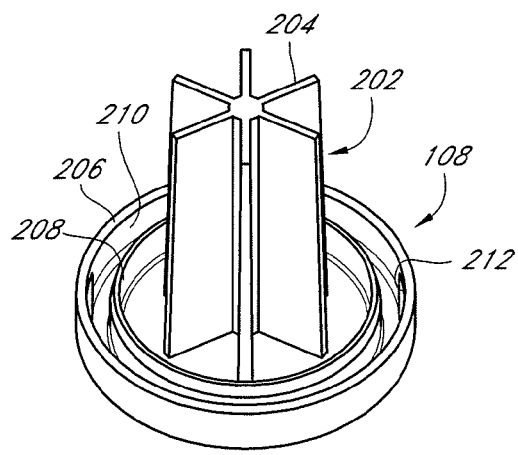
FIGS. 4A and 4B show an example plug that can couple with the housing configuration of FIGS. 3A and 3B to facilitate the separation and mixing of reactants.
Figure 4B:
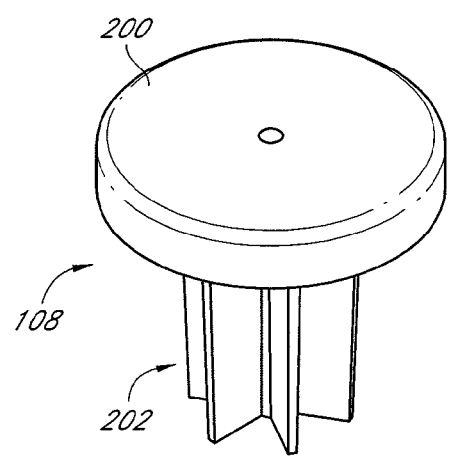

In certain embodiments, the second cap 106 can define a space for holding a reactant in a first compartment 120. As described herein, the housing 102 further defines an end wall at its second end, such that a portion of the housing can define a space for holding another reactant, similar to that associated with a second compartment 122 described herein in reference to FIG. 1. As shown in FIGS. 1 and 4, a plug 108 can be provided and configured to couple with the end wall of the housing 102 and provide sealing functionality. Thus, when the plug 108 is in its engaged position relative to the end wall of the housing 102, the spaces defined by the housing 102 and the second cap 106 are isolated, and the reactants therein do not interact with each other. In the context of the description herein, the plug 108 can also be referred to as a sealing cap or a barrier cap. In the particular example configuration (e.g., FIGS. 1 and 4) where the sealing cap can be installed by snapping it into its sealing position, the sealing cap can function as, and be referred to as, a snap cap.

As described herein, the plug 108 can be actuated so as to disengage from the end wall, thereby allowing the reactants to mix and react to, for example, absorb heat. Examples of reactants and endothermic reactions that can be utilized for cooling the contents of the prepackaged container are described in greater detail herein.

As shown in FIG. 1, the housing 102 can be dimensioned so that when the prepackaged container 110 is positioned therein, space is preferably provided between the bottom of the container 110 and the end wall so as to allow disengagement of the plug 108 and to provide sufficient room for interaction of the reactants. Space is preferably provided between the side of the container 110 and the side wall of the housing so as to allow storage of the reactant prior to the reaction, and to provide increased cooling area about the container during the reaction.

Figure 2A:
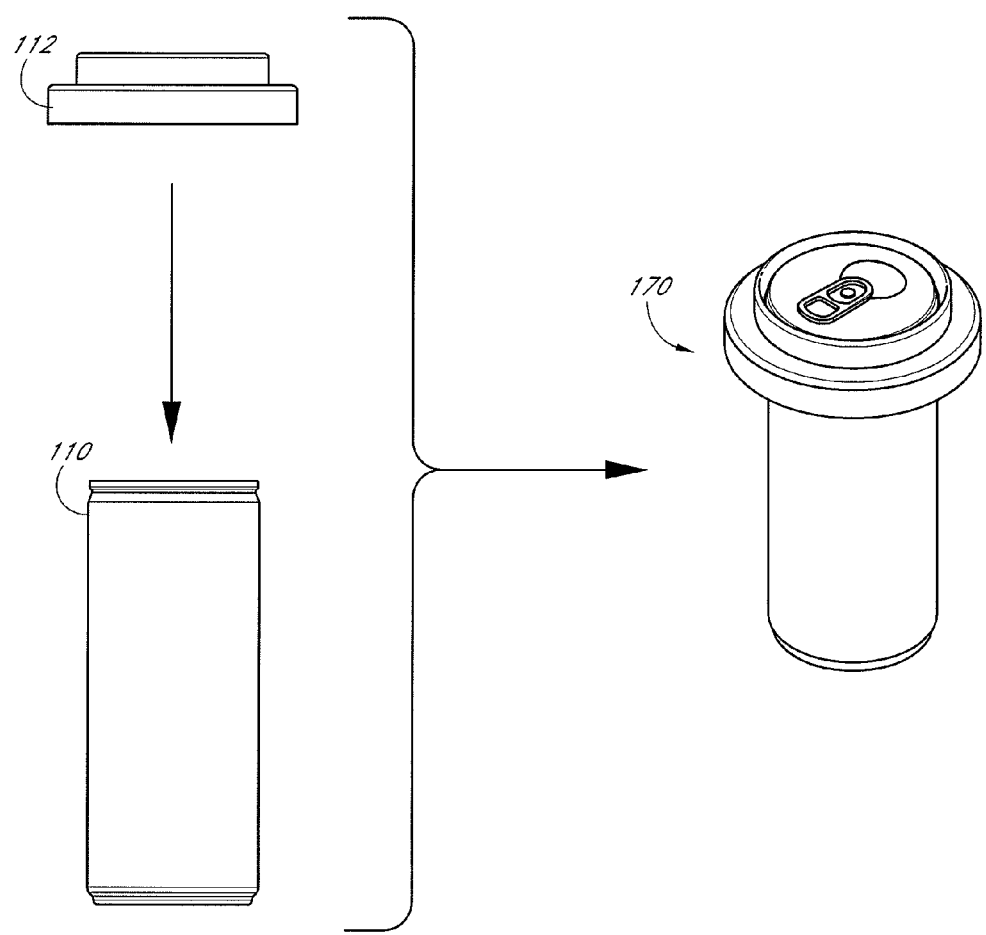
FIGS. 2A and 2B show an example of how a canned beverage or medical assay kit can be cooled by the self-cooling apparatus of FIG. 1.
Figure 2B:
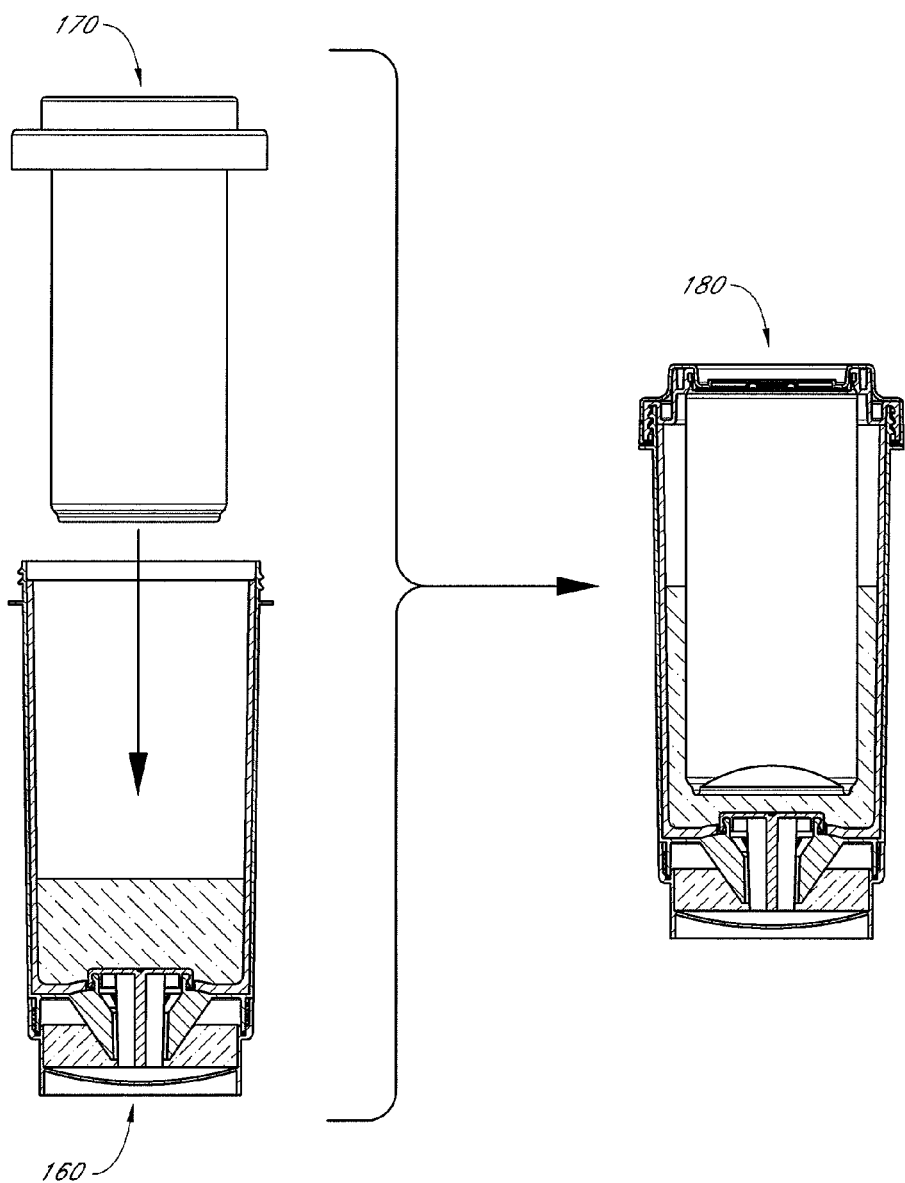
Figure 3A:
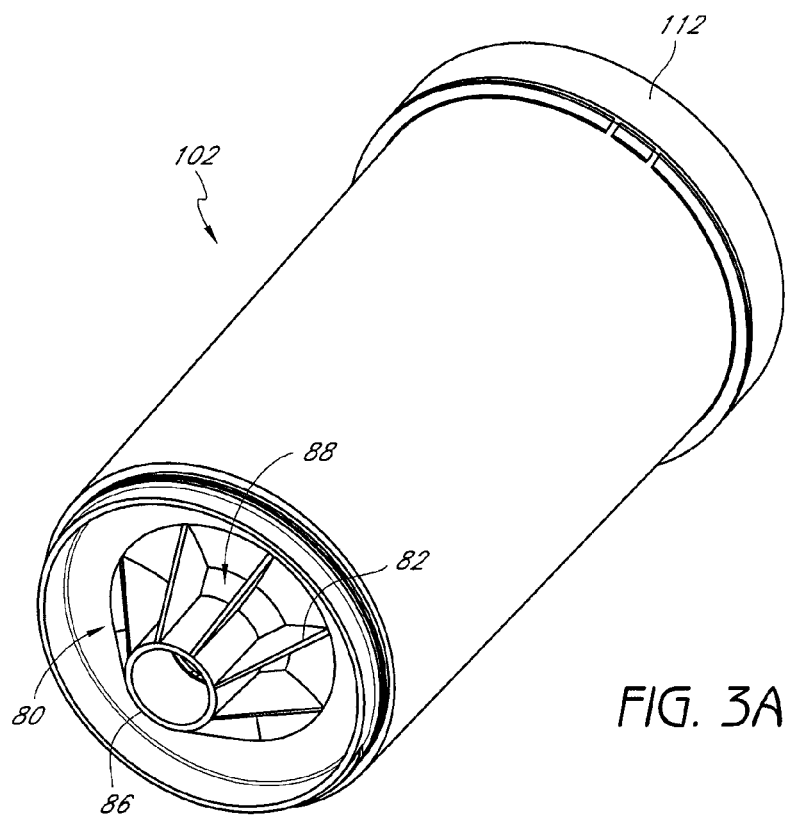
FIGS. 3A and 3B show an example of one end of a housing of the self-cooling apparatus of FIG. 1 configured to facilitate separation and mixing of reactants.
Figure 3B:
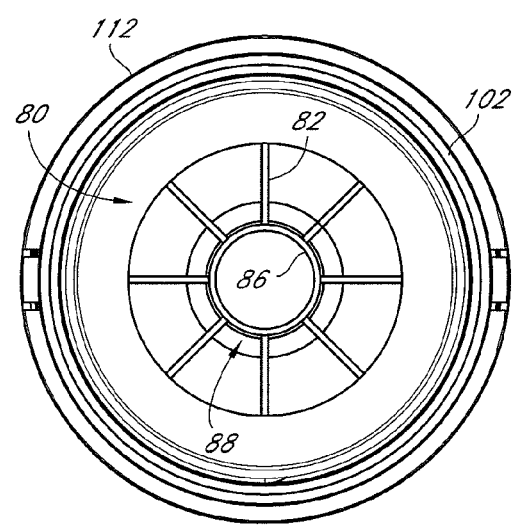

As is generally known, prepackaged containers such as cans have different sizes and/or materials. Accordingly, parameters such as housing dimensions, choice of reactants, and amount of reactants can be selected to accommodate such differences. FIGS. 2A and 2B further illustrate that the apparatus can be implemented such that a prepackaged container 170 (e.g., a prepackaged can) serves as an inner container body.

FIG. 1 further shows that, in certain embodiments, the second cap 106 can include a flexible bottom 126 for actuating the disengagement of the plug 108. In operation, a user may press the bottom 126 of the apparatus 100 toward the inner container body 124, and as a result of the force exerted upon the bottom 126, the second barrier member 144 will be pushed toward the inner container body 124 so that the second barrier member 144 at least partially disengages from the first barrier member 142 to open the barrier 128. Subsequently, the reactant within the first enclosed compartment 120 will be released and mix with the other second reactant provided within the second compartment 122. The endothermic reaction between the two reactants will cause heat to be transferred and exchanged to cool the substance in the cooling chamber 118. To maximize and facilitate the mixture of two reactants, the user can invert the apparatus 100 such that the apparatus 100 is upside down, compared to the orientation illustrated in FIG. 1, before pressing the bottom 126 of the outer container body 102, and optionally, shake the container after the barrier is opened to cause the reactants to mix.

Certain embodiments of a self-cooling apparatus described more fully in pending U.S. PreGrant Publications U.S. 20090078711 and U.S. 20090199843 which are hereinafter incorporated in their entity may be used for the self-cooling apparatus. The self-cooling containers may, however, be embodied in many different forms and should not be construed as limited to the embodiments set forth in the two referenced USPGPs; rather, these embodiments are provided so that this disclosure will be thorough and complete, and will fully convey the scope of the invention to those skilled in the art.

Many modifications and other embodiments of an appropriate self-cooling container will come to mind to one skilled in the art to which this invention pertains having the benefit of the teachings presented in the descriptions and the associated drawings disclosed in the pending U.S. Applications cited herein.

III. Methods of Cooling a Substance in a Chamber

Certain embodiments of the present invention are adapted to provide a method of cooling at least 177 mls. of a liquid from room temperature or 20-25° C. to a temperature of at least 10° C. in a chamber. The method includes contacting an aqueous solution with a solid chemical reactant mixture. The solid chemical reactant mixture preferably has a mass of less than 100 g. The aqueous solution is allowed to dissolve the solid chemical reactant mixture thereby producing a cooling solution. The cooling solution is allowed to remove heat from the chamber thereby cooling the substance to about 10° C. in the chamber.

There is described a method of cooling a substance in a chamber comprising: (a) contacting an aqueous solution with the solid chemical reactant mixture described above to form a cooling solution, said cooling solution being in fluid contact with said chamber, wherein said solid chemical reactant mixture comprises at least two chemical reactants; (b) allowing said first chemical reactant to sufficiently endothermically react with said aqueous solution to cool said cooling solution to within an lowered temperature range; (c) subsequent to step (b), allowing said second chemical reactant to sufficiently endothermically react with said aqueous solution to maintain said lowered temperature range thereby cooling said substance.

The method of cooling a substance in a chamber comprises adjusting a lowered temperature range based on the heat capacity of the substance to be cooled.

In an additional aspect, the method can be used for cooling a substance which is a liquid and the lower temperature range is from about 5° C. to about 0° C.

In one implementation, a method of cooling a substance in a chamber comprises: (a) contacting an aqueous solution with the solid chemical reactant mixture; (b) allowing the aqueous solution to dissolve the solid chemical reactant mixture thereby producing within two minutes a heat absorption solution having a temperature of at least 3° C., the heat absorption solution being in fluid contact with the chamber; (c) allowing the heat absorption solution to remove heat from the chamber while maintaining a temperature of at least 3° C. for at least two minutes within the heat absorption solution thereby cooling the substance in the chamber is described.

In another implementation, a method of cooling a substance in a chamber comprises: (a) contacting an aqueous solution with the solid chemical reactant mixture; (b) allowing the aqueous solution to dissolve the solid chemical reactant mixture thereby producing within two minutes a heat absorption solution having a temperature of at least 3° C. with the heat absorption solution being in fluid contact with the chamber; (c) allowing the heat absorption solution to remove heat from the chamber while maintaining a temperature of at least 3° C. for at least two minutes wherein the heat absorption solution thereby cools the substance. In a further aspect, the temperatures in steps (b) and (c) are independently about 3° C. to about 0° C. The substance to be cooled is selected from the group consisting of liquid, gel, agar, colloid, suspension, and semisolid.

In yet another implementation, a method of cooling at least 177 mls. of a liquid to a temperature of at least 3° C. in a chamber comprises: (a) contacting an aqueous solution with a solid chemical reactant mixture, wherein said solid chemical reactant mixture has a mass of less than 100 g.; (b) allowing the aqueous solution to dissolve the solid chemical reactant mixture thereby producing a heat absorption solution; (c) allowing the heat absorption solution to remove heat from the chamber thereby cooling the liquid to at least 3° C. in the chamber. In another aspect, the liquid can be cooled to at least 3° C. within two minutes of contacting the aqueous solution with the solid chemical reactant mixture. In yet another aspect, the liquid can be cooled to a temperature from about 5° C. to about 0° C.

In some implementation, upon contacting the aqueous solution with the solid chemical reactant mixture, the aqueous solution reacts with (e.g. dissolves) the solid chemical reactant mixture thereby producing cold (a lower temperature) environment. When the aqueous solution dissolves the solid chemical reactant mixture, the heat absorption is derived at least in part from the enthalpy of the solid chemical reactant mixture. The enthalpy of a solution occurs when an amount of chemical is dissolved in an aqueous solution (e.g. water or a solution containing water as the solvent) and diluted and an endothermic reaction occurs. The enthalpy is specific to the exact form of the chemical species. Certain embodiments of this and other aspects of the present invention are provided below. The embodiments described below are equally applicable to all aspects of the present invention.

In certain embodiments, upon contacting the aqueous solution with the solid chemical reactant mixture, the aqueous solution dissolves the solid chemical reactant mixture thereby producing, within five minutes, a cooling solution having a temperature of about 5° C. to about 0° C. More preferably, the cooling solution having a temperature of about 3° C. to about 0° C. is produced within four minutes, three minutes, two minutes, or one minute. The temperature may be at least 3° C. The temperature may also be from about 0° C. to about 5° C.

The temperature of the cooling solution described in the preceding paragraph is typically maintained for at least one minute, or more preferably at least two minutes, three minutes, four minutes, five minutes, or ten minutes. The cooling solution is the solution formed from the dissolution of the solid chemical reactant mixture (or portions thereof) by the aqueous solution.

In another embodiment, the cooling apparatus is used for cooling a liquid. The apparatus includes an aqueous solution and a solid chemical reactant mixture having a mass of less than 100 g. Upon contacting the aqueous solution with the solid chemical reactant mixture, the aqueous solution dissolves the solid chemical reactant mixture thereby producing a heat adsorbing solution capable of cooling at least 177 mls. of the liquid to about 3° C. to about 10° C. More preferably, the liquid is chilled to at least about 3° C., about 5° C., 7° C. or to about 10° C. In some embodiments, the liquid is chilled to at least 10° C. within two minutes of contacting the aqueous solution with the solid chemical reactant mixture. In other embodiments, upon breaking the breakable partition, the aqueous solution dissolves the solid chemical reactant mixture thereby producing a cooling solution capable of chilling at least one hundred seventy-seven mls. of the liquid to a temperature from about 3° C. to about 10° C.

In another aspect, the present invention provides a method of cooling a substance in a chamber (e.g. the cooling chamber). The method includes contacting an aqueous solution with a solid chemical reactant mixture to form a chilling solution (e.g. solubilizing the solid chemical reactant mixture with the aqueous solution). As described above, the cooling solution is in fluid contact with a chamber (i.e. the solution makes contact with the outer walls of the chamber). The solid chemical reactant mixture includes a first chemical reactant, and a second chemical reactant. The first chemical reactant is allowed to sufficiently endothermically react with the aqueous solution to cool the chilling solution to within a lowered temperature range. The second chemical reactant is then allowed to sufficiently endothermically react with the aqueous solution to maintain the lower temperature range. Typically, a third chemical reactant is allowed to sufficiently react with the aqueous solution to maintain the temperature range over a longer period of time thereby maintaining cold transfer and continuing to chill the substance.

In some embodiments, the method further includes adjusting the total amount of reactants used based on the heat capacity of the substance and temperature range desired. Appropriate substances (e.g. comestible liquids and solids), lowered temperature ranges (e.g. from 25° C. to less than 10° C.) and various other aspects of the method are described above (e.g. appropriate chemical solid chemical reactant mixtures, and other aspects of the embodiments described above).

In another aspect, embodiments of the present invention provides a method of chilling a substance in a chamber (e.g. a cooling chamber). The method includes contacting an aqueous solution with a solid chemical reactant mixture. The aqueous solution is allowed to dissolve the solid chemical reactant mixture thereby producing within two minutes a cooling solution having a temperature of at least 10° C. The cooling solution is in fluid contact with the chamber. Finally, the cooling solution is allowed to remove heat from the chamber while maintaining a temperature of at least 10° C. for at least one minute within the cooling solution thereby cooling the substance. In some embodiments, the temperatures of the cooling solutions in the dissolving step and the heat transfer step are independently from 7° C. to 10° C.

In another aspect, the present invention provides a method of cooling at least six ounces of a liquid to a temperature of at least 10° C. in a chamber (e.g. a chilling chamber). The method includes contacting an aqueous solution with a solid chemical reactant mixture. The solid chemical reactant mixture has a mass of less than 100 g. The aqueous solution is allowed to dissolve the solid chemical reactant mixture thereby producing a heat absorbing solution. The chilling solution is allowed to transfer cold to the chamber thereby cooling the liquid to at least 10° C. in the chamber.

In some embodiments, the liquid is cooled to at least 10° C. within five, or more preferable four, three or two minutes of contacting the aqueous solution with the solid chemical reactant mixture. The liquid may be cooled to a temperature of from 10° C. to about 5° C. The solid chemical reactant mixture may have a mass of less than 150 g., or more preferably less than 100 g., or less than 75 g. In some embodiments, the aqueous solution has a volume of less than 100 ml. The solid chemical reactant mixture may include urea, $NH_4NO_3$, and carrageenan.

Other embodiments, methods and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in the form and details may be made therein without departing from the spirit and scope of the invention.

IV. Examples

The following examples are meant to illustrate certain embodiments of the invention, and are not intended to limit the scope of the invention.

Examples 1-18

50 grams of water was weighed and placed into a foam cup. The dry chemicals were weighed as given and added to the cup and the solution mixed as indicated. In selected examples in the table the water weight was 25 g.

TABLE 1

| | | No. 1 | | | | | |
|---|---|---|---|---|---|---|---|
| | | 1A | | 1B | | 1C | |
| Chemical | Weight, g | Time, sec | Temp, ° C. | Time, sec | Temp, ° C. | Time, sec | Temp, ° C. |
| Urea | 10 | 0 | 28 | 0 | 26 | 30 | 16 |
| NH4Cl | 3 | 30 | n/d | 30 | n/d | 60 | 11 |
| KCl | 2 | 60 | n/d | 60 | n/d | 90 | 9 |
| 10% MgCl2 | 15 | 90 | n/d | 90 | 16 | 120 | 8 |
| | | 120 | n/d | 120 | n/d | 150 | 7 |
| | | 150 | n/d | 150 | n/d | 180 | 7 |
| | | 180 | n/d | 180 | n/d | 210 | 7 |
| | | 240 | 7 | 240 | n/d | 240 | 7 |

| | No. 2 | | |
|---|---|---|---|
| Chemical | Weight, g | Time, sec | Temp, ° C. |
| Urea | 10 | 0 | 27 |
| NH4Cl | 3 | 30 | n/d |
| KCl | 2 | 60 | n/d |
| 10% MgCl2 | 15 | 90 | n/d |
| | | 120 | n/d |
| | | 150 | n/d |
| | | 180 | 4 |

| | | No. 3 | | | | | |
|---|---|---|---|---|---|---|---|
| | | 3A | | | 3B | | |
| Chemical | Percent, % | Weight, g | Time, sec | Temp, ° C. | Weight, g | Time, sec | Temp, ° C. |
| Urea | 50 | 12.5 | 0 | 27 | 12.5 | 0 | 27 |
| NH4Cl | 15 | 3.75 | 30 | n/d | 3.75 | 30 | n/d |
| KCl | 12 | 3 | 60 | n/d | 3 | 60 | n/d |
| CaSO4•2H2O | 8 | 2 | 90 | n/d | 2 | 90 | n/d |
| Carrageenan | 12 | 3 | 120 | 3 | 3 | 120 | 3 |
| Borax | 1.5 | 0.38 | 150 | 3 | 0.38 | 150 | 3 |
| NaH2PO4•H2O | 1.5 | 38 | 180 | 3 | 38 | 180 | 3 |
| Water | | 12.5 | 240 | 3 | 25 | 240 | 3 |

| | | No. 3 | | | | | |
|---|---|---|---|---|---|---|---|
| | | 3C | | | 3D | | |
| Chemical | Percent, % | Weight, g | Time, sec | Temp, ° C. | Chemical | Weight, g | Time, sec | Temp, ° C. |
| Urea | 50 | 12.5 | 0 | 27 | Urea | 12.5 | 0 | 27 |
| NH4Cl | 15 | 3.75 | 30 | n/d | NH4Cl | 3.75 | 30 | n/d |
| KCl | 12 | 3 | 60 | n/d | KCl | 3 | 60 | n/d |
| CaSO4•2H2O | 8 | 2 | 90 | n/d | CaSO4•2H2O | 2 | 90 | n/d |
| Carrageenan | 12 | 3 | 120 | 3 | Carrageenan | 3 | 120 | 3 |

TABLE 1-continued

| | | | | | | | | |
|---|---|---|---|---|---|---|---|---|
| Borax | 1.5 | 0.38 | 150 | 3 | Borax | 0.38 | 150 | 3 |
| NaH2PO4•H2O | 1.5 | 38 | 180 | 3.5 | NaH2PO4•H2O | 38 | 180 | 3.5 |
| 10% MgCl2 | | 25 | 240 | 4 | 5% NaCl | 25 | 240 | 4 |

No. 4

| | 4A | | | | | 4B | | |
|---|---|---|---|---|---|---|---|---|
| Chemical | Percent, % | Weight, g | Time, sec | Temp, ° C. | Chemical | Percent, % | Weight, g | Time, sec | Temp, ° C. |
| Urea | 46 | 11.5 | 30 | 9 | Urea | 46 | 11.5 | 30 | 9 |
| NH4Cl | 23 | 5.75 | 60 | 3 | NH4Cl | 23 | 5.75 | 60 | 4 |
| KCl | 9 | 2.25 | 90 | 2 | KCl | 9 | 2.25 | 90 | 3 |
| CaSO4•2H2O | 4 | 1 | 120 | 2 | CaSO4•2H2O | 4 | 1 | 120 | 3 |
| Carrageenan | 15 | 3.75 | 150 | 2 | Carrageenan | 15 | 3.75 | 150 | 3 |
| Borax | 1.5 | 0.38 | 180 | 2.5 | Borax | 1.5 | 0.38 | 180 | 3 |
| NaH2PO4•H2O | 1.5 | 0.38 | 210 | 3 | NaH2PO4•H2O | 1.5 | 0.38 | 210 | 3.5 |
| Water | | 25 | 240 | 3.5 | 5% Na Cl | | 25 | 240 | 4 |

No. 5

| | 5 | | | |
|---|---|---|---|---|
| Chemical | Percent, % | Weight, g | Time, sec | Temp, ° C. |
| Urea | 36 | 9 | 30 | 7 |
| NH4Cl | 28 | 7 | 60 | 5 |
| KCl | 12 | 3 | 90 | 5 |
| NaCl | 12 | 3 | 120 | 5 |
| CaHPO4 | 6 | 1.5 | 150 | 5 |
| CaSO4•2H2O | 6 | 1.5 | 180 | 5.5 |
| Water | | 25 | 210 | 6 |
| | | | 240 | 6 |

No. 6

| | 6 | | | |
|---|---|---|---|---|
| Chemical | Percent, % | Weight, g | Time, sec | Temp, ° C. |
| Urea | 24 | 6 | 30 | 15 |
| NH4Cl | 18 | 4.5 | 60 | 14 |
| KCl | 12 | 3 | 90 | 13.5 |
| NaCl | 12 | 3 | 120 | 13 |
| CaSO4•2H2O | 4 | 1 | 150 | 13 |
| Carrageenan | 27 | 6.75 | 180 | 13.5 |
| Borax | 1.5 | 0.38 | 210 | 13.5 |
| NaH2PO4•H2O | 1.5 | 0.38 | 240 | 14 |
| Water | | 25 | | |

No. 7

| | 7 | | | |
|---|---|---|---|---|
| Chemical | Ratio | Weight, g | Time, sec | Temp, ° C. |
| Urea | 4 | 13.7 | 0 | 25.5 |
| NH4Cl | 1 | 3.4 | 30 | 10 |
| KCl | 1.7 | 5.8 | 60 | 5 |
| Carrageenan | 0.6 | 2.1 | 90 | 4 |
| Water | 7.3 | 25 | 120 | 3 |
| | | | 150 | 3 |
| | | | 180 | 3.5 |
| | | | 210 | 4 |
| | | | 240 | 4 |

No. 8

| | 8 | | | |
|---|---|---|---|---|
| Chemical | Ratio | Weight, g | Time, sec | Temp, ° C. |
| Urea | 4 | 3.7 | 0 | 25.5 |
| NH4Cl | 1 | 0.9 | 30 | 13 |
| KCl | 20 | 18.5 | 60 | 11 |
| Carrageenan | 2.3 | 2.1 | 90 | 11 |
| Water | 27.3 | 25 | 120 | 11 |
| | | | 150 | 11 |

TABLE 1-continued

No. 9

| | | | 9 | |
|---|---|---|---|---|
| Chemical | Ratio | Weight, g | Time, sec | Temp, ° C. |
| Urea | 2 | 11.4 | 0 | 25.5 |
| NH4Cl | 1 | 5.7 | 30 | 6 |
| KCl | 1 | 5.7 | 60 | 3.5 |
| Carrageenan | 0.4 | 2.3 | 90 | 2.5 |
| Water | 4.4 | 25 | 120 | 2.5 |
| | | | 150 | 2.5 |
| | | | 180 | 3 |
| | | | 210 | 3 |
| | | | 240 | 3.5 |

No. 10

| | | | 10 | |
|---|---|---|---|---|
| Chemical | Ratio | Weight, g | Time, sec | Temp, ° C. |
| Urea | 2 | 6.3 | 0 | 25 |
| NH4Cl | 4 | 12.6 | 30 | 7 |
| KCl | 0.6 | 1.9 | 60 | 5 |
| Carrageenan | 1.4 | 4.4 | 90 | 5 |
| Water | 8 | 25.2 | 120 | 5 |
| | | | 150 | 5 |
| | | | 180 | 5 |
| | | | 210 | 5 |
| | | | 240 | 5 |

No. 11

| | | | 11 | |
|---|---|---|---|---|
| Chemical | Ratio | Weight, g | Time, sec | Temp, ° C. |
| Urea | 40 | 11.9 | 0 | 25 |
| NH4Cl | 23 | 6.8 | 30 | 8 |
| KCl | 7 | 2.1 | 60 | 5 |
| CaSO4•2H2O | 4 | 1.2 | 90 | 3 |
| Carrageenan | 7 | 2.1 | 120 | 3 |
| Borax | 1.5 | 0.45 | 150 | 3 |
| NaH2PO4•H2O | 1.5 | 0.45 | 180 | 3.5 |
| Water | | 30 | 210 | 4 |
| | | | 240 | 4.5 |

No. 12

| | | | 12 | |
|---|---|---|---|---|
| Chemical | Ratio | Weight, g | Time, sec | Temp, ° C. |
| Urea | 40 | 15.3 | 0 | 24.5 |
| NH4Cl | 10 | 3.8 | 30 | 7 |
| KCl | 5 | 1.9 | 60 | 4 |
| CaSO4•2H2O | 3.5 | 1.3 | 90 | 2.5 |
| Carrageenan | 5 | 1.9 | 120 | 2 |
| Borax | 1 | 0.4 | 150 | 2 |
| NaH2PO4•H2O | 1 | 0.4 | 180 | 2 |
| Water | | 25 | 210 | 2.5 |
| | | | 240 | 3 |

No. 13

| | | | 13 | |
|---|---|---|---|---|
| Chemical | Ratio | Weight, g | Time, sec | Temp, ° C. |
| Urea | 10 | 12.3 | 0 | 25 |
| NH4Cl | 3 | 3.7 | 30 | 10.5 |
| KCl | 1.5 | 1.8 | 60 | 7 |
| Carrageenan | 1.2 | 1.5 | 90 | 7 |
| Water | 25 | 30.7 | 120 | 6 |
| | | | 150 | 6 |
| | | | 180 | 6 |
| | | | 210 | 6.5 |
| | | | 240 | 7 |

TABLE 1-continued

No. 14

| | | | 14 A | | 14 B | |
|---|---|---|---|---|---|---|
| Chemical | Ratio | Weight, g | Time, sec | Temp, °C. | Time, sec | Temp, °C. |
| NH4NO3 | 3 | 21.4 | 0 | 25 | 0 | 25 |
| Water | 4 | 28.6 | 30 | 0 | 5 | 10 |
| | | | 60 | −1 | 20 | 2 |
| | | | 90 | −1.5 | 25 | 0 |
| | | | 120 | −1 | 40 | −2.5 |
| | | | 150 | −1 | 60 | −3 |
| | | | 180 | 0 | 90 | −2 |
| | | | 210 | 0 | 120 | −2 |
| | | | 240 | 0.5 | 150 | −1 |
| | | | | | 180 | 0 |
| | | | | | 210 | 0.5 |
| | | | | | 240 | 1 |

No. 15

| | | | 15 | |
|---|---|---|---|---|
| Chemical | Ratio | Weight, g | Time, sec | Temp, °C. |
| NH4NO3 | 1 | 16.7 | 0 | 25 |
| Water | 2 | 33.3 | 5 | 16 |
| | | | 20 | 8 |
| | | | 30 | 3 |
| | | | 60 | 3 |
| | | | 90 | 3.5 |
| | | | 120 | 5 |

No. 16

| | | | 16 | |
|---|---|---|---|---|
| Chemical | Ratio | Weight, g | Time, sec | Temp, °C. |
| Urea | 1 | 12.5 | 0 | 24.5 |
| NH4NO3 | 1 | 12.5 | 5 | 16 |
| Water | 2 | 25 | 20 | 7 |
| | | | 30 | 5 |
| | | | 60 | 1 |
| | | | 74 | 0 |
| | | | 90 | −1 |
| | | | 120 | −1.5 |
| | | | 150 | −1.5 |
| | | | 180 | −1 |
| | | | 210 | −1 |
| | | | 240 | −1 |
| | | | 270 | 0 |
| | | | 300 | 0 |

No. 17

| | | | 17 | |
|---|---|---|---|---|
| Chemical | Ratio | Weight, g | Time, sec | Temp, °C. |
| NH4NO3 | 3 | 20.5 | 0 | 24.5 |
| Carrageenan | 0.3 | 2.1 | 5 | 15 |
| Water | 4 | 27.4 | 10 | 10 |
| | | | 16 | 5 |
| | | | 30 | 0 |
| | | | 60 | 0 |
| | | | 90 | 0 |
| | | | 120 | 0 |
| | | | 150 | 0 |
| | | | 180 | 0 |
| | | | 210 | 0.5 |
| | | | 240 | 1 |

TABLE 1-continued

No. 18

| Chemical | Ratio | Weight, g | Time, sec | 18 Temp, ° C. |
|---|---|---|---|---|
| Urea | 10 | 12.2 | 0 | 24.5 |
| NH4NO3 | 10 | 12.2 | 10 | 18 |
| Carrageenan | 1 | 1.2 | 20 | 7 |
| Water | 20 | 24.4 | 30 | 5 |
|  |  |  | 60 | 1 |
|  |  |  | 90 | −0.5 |
|  |  |  | 120 | −0.5 |
|  |  |  | 150 | −1 |
|  |  |  | 180 | −1 |
|  |  |  | 210 | −0.5 |
|  |  |  | 240 | 0 |
|  |  |  | 270 | 0.5 |
|  |  |  | 300 | 1 |

NOTES:
1A: Stirred vigorously
1B: Shook in a closed cup
1C: No shaking; swirling only Examples 19-23

50 grams of water was weighed and placed into a foam cup. 25 grams of ammonium nitrate and 25 grams of urea were weighed and mixed together. The dry chemicals were added to the cup and the solution mixed for one minute. After one minute the temperature of the cooling solution was −6° C. and after two minutes was −8° C. The same experiment was repeated with the exception of using 30 grams of $NH_4NO_3$ and 20 grams of urea and the temperature of the chilling solution reached −5° C. in one minute and −7° C. in two minutes. Repeating the same experiment with 35 grams each of $NH_4NO_3$ and urea, the temperature of the cooling solution reached −6° C. in one minute and −10° C. in two minutes. Again using 30 grams of urea and 20 grams of $NH_4NO_3$ it was found that the temperature of the cooling solution was −4° C. in one minute and −6° C. in two minutes. When 50 grams of each reactant, water, urea, $NH_4NO_3$, were used the solution reached −7° C. in one minute and −11° C. in two minutes.

Examples 24-26

50 grams of water was weighed and placed into a foam cup. 20 grams of ammonium nitrate, 25 grams of urea, and 5 grams of sodium succinate were weighed and mixed together. The dry chemicals were added to the cup and the solution mixed for one minute. After one minute the temperature of the cooling solution was −4° C. and after two minutes was −7° C. The same experiment was repeated with the exception of using 25 grams of $NH_4NO_3$, 25 grams of urea, and 5 grams of sodium succinate and the temperature of the chilling solution reached −5° C. in one minute and −7° C. in two minutes. Repeating the experiment with 50 grams of water, 35 grams of $NH_4NO_3$, 35 grams of urea, and 10 grams of sodium succinate the solution reached −5° C. in one minute and −10° C. in two minutes.

Examples 27-28

50 grams of water was weighed and placed into a foam cup. 20 grams of ammonium nitrate, 25 grams of urea, and 5 grams of oxalic acid.2H2O were weighed and mixed together. The dry chemicals were added to the cup and the solution mixed for one minute. After one minute the temperature of the cooling solution was −1° C. and after two minutes was −4° C. The same experiment was repeated with the exception of using 35 grams of $NH_4NO_3$, 35 grams of urea, and 10 grams of oxalic acid anhydrous and the temperature of the chilling solution reached 2° C. in one minute and −1° C. in two minutes.

Examples 29-33

In this set of experiments only one chemical dry reactant was added to water.

50 grams of water was weighed and placed into a foam cup. 50 grams of urea was weighed. The dry chemical was added to the cup and the solution mixed for one minute. After one minute the temperature of the cooling solution was 3° C. and after two minutes was about 1.5° C. The same experiment was repeated using 50 grams of $NH_4NO_3$ and after one minute the temperature of the chilling solution reached −5° C. and after two minutes reached −7° C. The same experiment using 50 grams of sodium succinate the cooling solution reached a temperature of 10° C. after one minute and 9° C. after two minutes. Repeating the experiment with 50 grams of oxalic acid and $H_2O$ the solution reached a temperature of 12° C. in one minute and remained at 12° C. The same experiment repeated with the exception of 50 grams of urea oxalate the cooling solution reached a temperature of 19° C. for both the one and two minute measurement.

Examples 33-53

In these experiments two different types of urea, sodium phosphate dibasic, sodium sulfate, sodium phosphate dodecahydrate, and sodium tripolyphosphate and sodium polyphosphate were examined. Using a plastic beaker containing 100 grams of distilled water varying amounts of the dry chemical concentration was added and the cooling profile recorded for each chemical at 0, 1, 2, 3, 4, and 5 minutes. The results are in Table 2.

TABLE 2

| Sample | 0 min. $T_0$, °C. | 1 min. $T_1$, °C. | 2 min. $T_2$, °C. | 3 min. $T_3$, °C. | 4 min. $T_4$, °C. | 5 min. $T_5$, °C. |
|---|---|---|---|---|---|---|
| Urea, 99-100.5% | | | | | | |
| 25 g | 25 | 19 | 13 | 13 | 14 | 14 |
| 50 g | 24 | 13 | 6 | 5 | 5 | 5.5 |
| 75 g | 24 | 8 | 4 | 3 | 3 | 3.5 |
| Urea, 98% | | | | | | |
| 25 g | 24 | 18 | 14.5 | 14.5 | 15 | 15 |
| 50 g | 24 | 13 | 7 | 7 | 8 | 8 |
| 75 g | 24 | 9 | 4 | 3.5 | 3.5 | 4 |
| Sodium Phosphate Dibasic | | | | | | |
| 25 g | 24.5 | 22 | 21 | 21 | 21 | 21 |
| 50 g | 25 | 22 | 22 | 22 | 22 | 22 |
| 75 g | 25 | 22.5 | 22.5 | 22.5 | 22.5 | 22.5 |
| Sodium Sulfate | | | | | | |
| 25 g | 25 | 15.5 | 15.5 | 15.5 | 15.5 | 16 |
| 50 g | 24 | 15 | 14 | 14 | 14 | 14 |
| 75 g | 23 | 11 | 10 | 9 | 9 | 9 |
| Sodium Phosphate Dodecahydrate, 98+% | | | | | | |
| 25 g | 25 | 20 | 19 | 19 | 19 | 19 |
| 50 g | 24 | 19 | 18 | 18 | 18 | 18 |
| 75 g | 24 | 20 | 19 | 19 | 19 | 19 |
| Sodium Tripolyphosphate Tech, 85% | | | | | | |
| 25 g | 24 | 29 | 29 | 29 | 29 | 29 |
| 50 g | 24 | 35 | 35 | 35 | 35 | 35 |
| 75 g | 24 | 43 | 43 | 43 | 43 | 42 |
| Sodium Polyphosphate Crystal, 96% | | | | | | |
| 25 g | 24 | 25 | 29 | 29 | 29 | 29 |
| 50 g | 24 | 25 | 35 | 34 | 34 | 34 |
| 75 g | 24 | 40 | 40 | 38 | 37 | 36 |

Examples 54-63

The beakers were prepared as in example 33 except that the water was changed to a different solution. Different concentrations of sodium chloride and ethanol mixtures were tried. There were three concentrations of sodium chloride, 5, 10 and 15% and two different concentrations of ethanol 5 and 10%. The urea utilized was technical grade and the results are given in Table 3.

TABLE 3

| Sample | 0 min. $T_0$, °C. | 1 min. $T_1$, °C. | 2 min. $T_2$, °C. | 3 min. $T_3$, °C. | 4 min. $T_4$, °C. | 5 min. $T_5$, °C. |
|---|---|---|---|---|---|---|
| Urea, 98% from the Bucket, 75 g | | | | | | |
| 5% NaCl, 100 g | 23 | 6 | 3 | 2.5 | 2.5 | 2.5 |
| 10% NaCl, 100 g | 22 | 7 | 3 | 3 | 3 | 3 |
| 15% NaCl, 100 g | 22 | 7 | 3.5 | 3 | 3 | 3 |
| 5% Ethanol, 100 g | 24.5 | 8.5 | 4 | 3.5 | 3.5 | 3.5 |
| 10% Ethanol, 100 g | 25.5 | 9 | 5 | 4 | 4 | 4 |
| Urea, from the Bag, 75 g | | | | | | |
| 5% NaCl, 100 g | 22 | 5 | 4 | 3 | 3 | 3 |
| 10% NaCl, 100 g | 21 | 5 | 4 | 3 | 3 | 3 |

TABLE 3-continued

| Sample | 0 min. $T_0$, °C. | 1 min. $T_1$, °C. | 2 min. $T_2$, °C. | 3 min. $T_3$, °C. | 4 min. $T_4$, °C. | 5 min. $T_5$, °C. |
|---|---|---|---|---|---|---|
| 15% NaCl, 100 g | 21 | 5.5 | 4.5 | 3.5 | 3.5 | 3.5 |
| 5% Ethanol, 100 g | 23 | 6 | 5 | 3 | 3 | 3 |
| 10% Ethanol, 100 g | 24 | 9 | 6 | 4 | 4 | 4 |

Examples 64-66

The experiment was essentially the same as examples (Examples 54 to 58) in Table 3 except the chemical weights were less.

TABLE 4

| Sample Urea, 98% from the Bucket, 37.5 g | 0 min. $T_0$, °C. | 1 min. $T_1$, °C. | 2 min. $T_2$, °C. | 3 min. $T_3$, °C. | 4 min. $T_4$, °C. | 5 min. $T_5$, °C. |
|---|---|---|---|---|---|---|
| 5% NaCl, 50 g | 21.5 | 7 | 5 | 5 | 5 | 5 |
| 10% NaCl, 50 g | 21.5 | 6 | 6 | 6 | 6 | 6 |
| 15% NaCl, 50 g | 21.5 | 7.5 | 7 | 6 | 6 | 6 |

Examples 67-69

Using same techniques as in earlier examples in Tables 3 and 4 magnesium chloride was used as the dry chemical and the best grade of urea. The liquid magnesium chloride solution was at three different concentrations and 100 grams were used. Table 5 lists the results.

TABLE 5

| Sample Urea, 98% from the Bucket, 75 g | 0 min. $T_0$, °C. | 1 min. $T_1$, °C. | 2 min. $T_2$, °C. | 3 min. $T_3$, °C. | 4 min. $T_4$, °C. | 5 min. $T_5$, °C. |
|---|---|---|---|---|---|---|
| 5% MgCl$_2$, 100 g | 24 | 7 | 2.5 | 2.5 | 2.5 | 2.5 |
| 10% MgCl$_2$, 100 g | 24 | 7 | 3 | 2.5 | 2 < T < 2.5 | 2 < T < 2.5 |
| 15% MgCl$_2$, 100 g | 24 | 7 | 3.5 | 3 | 3 | 3 |

Examples 70-71

Using the cups described in U.S. Patent Application 20090078711, filed Mar. 26, 2009, and U.S. Patent Application 20090199843 filed Aug. 13, 2009, which are hereby incorporated by reference in their entity, the following conditions were utilized. One cup contained 74.9 grams of 10% Magnesium chloride solution and 85.7 grams of urea. The cup was shaken for one minute and then left upside down for two minutes. The liquid within the cup was 19° C. The second cup contained 67.3 grams of 10% magnesium chloride and 90.3 grams of urea. After two minutes of shaking, the cup was allowed to stand for three minutes.

Example 72

Using a beaker 75 grams of 10% magnesium chloride and 85 grams of urea were mixed. The following temperatures were recorded: one minute, 3.4° C.; two minutes, 3.1° C.; three minutes, 2.8° C.; and at four minutes, 2.5° C.

While certain embodiments of the inventions have been described, these embodiments have been presented by way of example only, and are not intended to limit the scope of the disclosure. Indeed, the novel compositions, methods and systems described herein may be embodied in a variety of other forms; furthermore, various omissions, substitutions and changes in the form of the compositions, methods and systems described herein may be made without departing from the spirit of the disclosure. The accompanying claims and their equivalents are intended to cover such forms or modifications as would fall within the scope and spirit of the disclosure.

What is claimed is:

1. A self-cooling apparatus comprising:
   a cooling chamber containing a substance to be cooled, wherein the cooling chamber comprises a can;
   a reactant chamber adjacent to the cooling chamber, wherein the reactant chamber comprises a first enclosed compartment which contains a first reactant and a second enclosed compartment which contains a second reactant, wherein the first and second reactants are configured to react when activated to form a coolant;
   a breakable partition between the first enclosed compartment and the second enclosed compartment; and
   wherein the cooling chamber maintains a temperature differential between the substance to be cooled inside the can and the coolant in the reactant chamber, the temperature differential is sufficient to maintain the substance at a temperature range from about 10° C. to about 0° C.

2. The apparatus of claim 1 wherein the can comprises aluminum.

3. The apparatus of claim 1 wherein the can is a prepackaged can.

4. The apparatus of claim 1 wherein the can is an aluminum prepackaged can.

5. The apparatus of claim 1 wherein the cooling chamber contains at least 6 ounces of the substance.

* * * * *